2,775,610

PREPARATION OF CYANO ORGANICSULFONYL CHLORIDES

Frederick Comte, Kirkwood, Mo., assignor to Monsanto Chemical Company, St. Louis, Mo., a corporation of Delaware No Drawing. Application July 8, 1954,
Serial No. 442,212

4 Claims. (Cl. 260—465)

This invention relates to the preparation of cyano organicsulfonyl chlorides and more particularly pertains to an improved process for preparing cyano organicsulfonyl chlorides from trichlorophosphazo organic acyl chlorides.

Because of the presence of two exceedingly reactive groups in cyano organicsulfonyl chlorides NC—A—SO₂Cl wherein A is a divalent organic group; these compounds are exceptionally useful as intermediates in the synthesis of other organic chemical compounds. For example, cyano organicsulfonyl chlorides such as p-cyanobenzenesulfonyl chloride can be used as an intermediate in the preparation of alkyl substituted sulfamyl derivatives of organic acids such as p-(di-n-propylsulfamyl) benzoic acid by reacting a primary or secondary amine with the cyano organicsulfonyl chloride in an alkaline medium, for example in the presence of sodium hydroxide, and acidifying the resulting product. The cyano group can be reduced to form a primary methyl amino group, or it can be reacted with an alcohol to form an imido ester group, or it can be oxidized to an isocyano group which reacts with alcohols to form urethanes or with ammonia or amines to form ureas, or the cyano group can be utilized in any other of the nitrile reactions. Likewise the sulfonyl chloride group can be utilized in the preparation of an unsubstituted sulfonamide group as well as mono- and di-substituted sulfonamide groups, or in the preparation of esters by the reaction of the sulfonyl chloride group with an alcohol or in the preparation of numerous other groups by utilizing the reactivity of the sulfonyl chloride group.

In general, the process of this invention is an improved process for preparing cyano organicsulfonyl chlorides from trichlorophosphazo organic acyl chlorides. The conversion of a trichlorophosphazosulfonyl organic acyl chlorides to a cyano organicsulfonyl chloride takes place according to the following reaction,

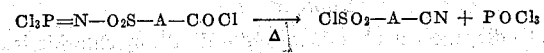

wherein A is a divalent organic group. The precise reaction mechanics of the above conversion reaction has not been definitely established. Considerable evidence has been presented to indicate that the conversion involves an intermolecular reaction although the possibility of an intramolecular rearrangement or reaction has not been positively overruled. However, the process of this invention is not dependent upon the precise mechanics of the conversion of the trichlorophosphazo acyl chloride.

One method suggested for the conversion of a trichlorophosphazosulfonyl organic acyl chloride to a cyano organicsulfonyl chloride is to merely heat the dry solid precursor to a temperature of at least 200° C. Another method suggested for this conversion is to heat a solution of the precursor a trichlorophosphazosulfonyl organic acyl chloride in dry carbon tetrachloride to a temperature of 200° C. or above. The latter process would of course have to be carried out under pressure. Both of these methods suggested for achieving the desired conversion reported substantially quantitative yields of the cyanoaromatic sulfonyl chloride. However, it has been found that quantities greater than about 0.1 gram mole of the trichlorophosphazosulfonyl organic acyl chloride heated according to either of the suggested methods give very erratic results. For example, the conversion will begin at 150° C. one time, 190° C. at another time and at a temperature of above 200° C. at still another time. Also, the erratic nature of the conversion reaction plus the exothermic nature of this reaction makes control of the reaction temperature difficult causing a substantial portion of the desired product to decompose to a cyano organic chloride through the destruction of the sulfonyl chloride group splitting out SO₂ because of excessively high temperatures. Obviously, large scale production of a cyanoorganicsulfonyl chloride cannot be successfully achieved by either of the suggested methods for accomplishing the conversion at any known or predictable temperature.

It is an object of this invention to provide an efficient process for converting a trichlorophosphazosulfonyl organic acyl chloride to a cyano organicsulfonyl chloride at a predeterminable and certain temperature. It is also an object of this invention to provide a conversion process which will be reproducible at any desired temperature. Other objects of this invention will be obvious from the description hereinafter appearing.

It has been discovered that the conversion of trichlorophosphazosulfonyl organic acyl chlorides having the formula $$Cl_3P=N-O_2S-A-COCl$$

wherein A is a divalent organic group, to the corresponding cyano sulfonyl chloride can be accomplished by heating said trichlorophosphazosulfonyl acyl chloride in the presence of a small amount, up to 10% by weight or more, of the desired cyanosulfonyl chloride previously prepared. The reaction can be carried out in the presence of an inert reaction diluent which may be a solvent for either the starting material or the end product. However, the diluent need not be a solvent for any of the chemical compounds present.

In general the process of this invention is carried out by heating the trichlorophosphazosulfonyl organic acyl chloride to the desired conversion temperature, under 200° C., adding the cyanosulfonyl chloride and heating the mixture at the desired conversion tempreature. Any amount of the cyanosulfonyl chloride can be added since it will be the ultimate product. Excellent results can be obtained by adding as little as 2.0 parts up to 10 parts by weight for each 100 parts by weight of the trichlorophosphazosulfonyl acyl chloride. By following the process of this invention temperatures of 200° C. or above are not involved and consequently the formation of cyano organic chlorides by splitting out of SO₂ does not take place, and the resulting formation of undesirable by-products such as cyano organic chloride and tarry materials by side reactions is substantially eliminated. In the preferred process of this invention there is used from about 1 to 10 parts by weight of the cyanosulfonylchloride per 100 parts by weight of the trichlorophosphazo compound for satisfactory results at temperatures of from 150° to 190° C. More specifically the trichlorophosphazosulfonyl organic acyl chloride is heated in the presence of the cyanosulfonyl chloride moderator at the predetermined temperature between 150° and 190° C. while removing the phosphoryl chloride as rapidly as formed thus producing substantially pure cyano organic sulfonylchloride. To facilitate the removal of the phosphoryl chloride split out during the conversion can be conveniently and rapidly removed under reduced pressure of from 75 to 200 mm. Hg absolute. However, substantially equivalent results can be obtained at higher pressures, pressures from 200 mm. Hg absolute to atmospheric pressure, but of course in a longer time. The process of this invention will be described and illustrated in greater detail in the specific examples hereinafter appearing.

Trichlorophosphazosulfonyl organic acyl chlorides which can be converted to cyano organic chlorides according to this invention are those having the formula $$Cl_3P=N-O_2S-A-COCl$$

wherein A is a divalent organic group. The divalent group A can be alpihatic or aromatic groups including alkyl, alicyclic including groups derived from naphthenes, aryl, alkaryl and aralkyl hydrocarbon groups as well as such groups containing nonhydrocarbon substituents such as halogens, ether and thioether substituents such as alkoxy, aryloxy, alkylthio and arylthio, nitro, amino, among others. Such groups as the hydroxy, carboxy, amino, monosubstituted amino and other reactive groups can also be present, however, such reactive groups are generally displaced during the preparation of the trichlorophosphazosulfonyl organic acyl chloride which is accomplished by reacting a sulfonyl organic carboxylic acid with phosphorous pentachloride. Although the above formula indicates the presence of only one trichlorophosphazosulfonyl group, $Cl_3P=N-O_2S-$, and one acyl chloride group, the process of this invention is not limited solely thereto for compounds containing more than one of either of these groups can be employed in the process of this invention.

Typical trichlorophosphazosulfonyl organic acyl chloride reactants which can be employed in the process of this invention include among others trichlorophosphazosulfonyl acetyl chloride, 3-trichlorophosphazosulfonyl propionylchloride, trichlorophosphazosulfonyl stearylchloride, trichlorophosphazosulfonyl cyclopentane acyl chloride, p - (trichlorophosphazosulfonyl) cyclohexane acyl chloride, p - (trichlorophosphazosulfonyl) benzoylchloride, 7 - trichlorophosphazosulfonyl - 3 - phenanthrene acyl chloride, 4 - trichlorophosphazsulfonyl - 1-naphthoylchloride, 5 - trichlorophosphazosulfonyl - 1-naphthoxychloride, trichlorophosphazosulfonyl-nicotinylchloride, di - (trichlorophosphazosulfonyl) phthalylchlorides, 4,5 - di(trichlorophosphazosulfonyl) - 1,8 naphthalylchloride, trichlorophosphazosulfonyl cyclohexyl acetyl chloride, β - (p - trichlorophosphazosulfonylbenzoyl) propionyl chloride, trichlorophosphazosulfonyl nitrobenzoyl chloride, trichlorophosphazosulfonylchlorobenzoyl chloride, trichlorophosphazosulfonyl chlorocyclohexane acetyl chloride, and 5-(trichlorophosphazosulfonyl)-2 furyl chloride.

The following examples are illustrative of the process of this invention. In these examples all parts are by weight.

Example I

There is heated 429 parts of a mixture containing 263 parts p-trichlorophosphazosulfonyl benzoyl chloride and 166 parts of phosphoryl oxychloride in suitable distillation equipment at about 60-65° C. and a reduced pressure of about 217 mm. Hg until about 90% of the phosphoryl chloride has been distilled off. Thereafter the temperature is increased to 190° C., 13 parts of p-cyanobenzenesulfonyl chloride are added, and POCl₃ split out by the rearrangement reaction is again distilled off. The reaction medium is maintained at about 217 mm. Hg and 190° C. for about 3 hours, the pressure is then further reduced to 100 mm. Hg and held there for about one hour. The residual material is cooled to 50° C. and 156 parts of toluene is added thereto. The resulting mixture is heated to 70° C., filtered and the filter cake is washed with 56 parts of hot toluene (65° C.). There is recovered 359.3 parts of toluene solution of which 212 parts are toluene and 160 parts are p-cyanobenzenesulfonyl chloride including the 13 parts charged.

Example II

The process of Example I is repeated except that 26 parts of p-cyanobenzenesulfonyl chloride are added in place of the 13 parts when the distillation temperature had reached 170° C. at 200 mm. Hg absolute. The yield of p-cyanobenzenesulfonyl chloride recovered is about 95%.

Example III

The process of Example I is repeated except that 6 parts of p-cyanobenzenesulfonyl chloride are added in place of the 13 parts when the distillation temperature had reached 180° C. at 200 mm. Hg absolute. The yield of p-cyanobenzenesulfonyl chloride recovered is about 95%.

Example IV

The process of Example I is repeated except that a conversion temperature of 150° C. and a pressure of 150 mm. Hg absolute are employed. The yield of p-cyanobenzenesulfonyl chloride recovered is substantially the same.

Example V

To prepare 2-cyano-5-furansulfonyl chloride, one mole of 5-(trichlorophosphazosulfonyl)-2-furyl chloride in 503 parts of phosphoryl chloride obtained by the reaction of about 2.5 moles of PCl₅ with one mole of 2-sulfamyl-5-furoic acid in the presence of 350 parts of POCl₃, is heated in suitable distillation equipment at 200 mm. Hg until about 450 parts of POCl₃ is distilled off between a temperature of 75° C. and 160° C. While maintaining a temperature of about 160° C. and 200 mm. Hg pressure, 10 parts of 2-cyano-5-furansulfonyl chloride previously prepared are added to the hot material in the still pot. The rate of distillation of phosphoryl chloride again increases indicating that the rearrangement reaction is taking place splitting out POCl₃. When the distillation of POCl₃ apparently stops, the pressure in the distillation equipment is reduced to about 75 mm. Hg absolute for about an hour and no heat is supplied to the still pot. The residue in the still pot is cooled to about 50° C. and then dissolved in toluene and the resulting solution filtered. 2-cyano-5-furansulfonyl chloride can be recovered by distilling off the toluene at reduced pressure.

2-cyano-5-furansulfonyl chloride,

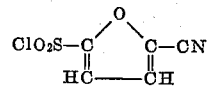

can be converted to 5-(di-n-propyl) sulfamyl-2-furoic acid, a compound similar to Benemid, by reaction with di-n-propylamine in the presence of sodium hydroxide followed by acidification with hydrochloric or sulfuric acid.

Example VI 1,8 - dicyano - naphthalene - 4,5 - disulfonylchloride is prepared by heating 0.25 mole of 4,5-di(trichlorophosphazosulfonyl) 1,8-naphthalyl dichloride obtained from the reaction of 0.25 mole 4,5-disulfamyl-1,8-naphthoic acid and 1.25 moles of PCl₅ in POCl₃ after removing the free POCl₃, to about 175° C. at 200 mm. Hg absolute in the presence of 10 parts of 1,8-dicyano-naphthalene-4,5-disulfonylchloride and removing the POCl₃ split out as rapidly as formed. When POCl₃ is no longer evolved, the residue is held at about 90 mm. Hg absolute until its temperature is about 50° C. The desired produce is obtained in an excellent yield.

Example VII p-Cyanocyclohexanesulfonyl chloride is obtained from p-trichlorophosphazosulfonylcyclohexyl acyl chloride, prepared by reacting PCl₅ with p-sulfamylcyclohexane carboxylic acid, by heating at 160° C. at about 180 mm. Hg absolute in the presence of 4% by weight of p-cyanocyclohexanesulfonyl chloride while removing the POCl₃ evolved substantially as rapidly as formed. When POCl₃ is no longer evolved, the pressure is further reduced to about 85 mm. Hg and there maintained until the residual material is cooled to about 50° C. The residue is the desired product.

*Example VIII*

4 - trichlorophosphazosulfonyl-2-nitrobenzoyl chloride, obtained by reacting 4-sulfamyl-2-nitrobenzoic acid with PCl₅ is heated to 150° C. at about 190 mm. Hg absolute in the presence of 4% by weight of 4-cyano-2-nitrobenzenesulfonyl chloride while removing the POCl₃ as rapidly as formed. When POCl₃ is no longer evolved, the resulting residue is held at a pressure of about 100 mm. Hg absolute without heating until its temperature reaches 50° C. The residual material, 4-cyano-2-nitrobenzenesulfonyl chloride, is produced in substantially quantitative yields.

What is claimed is:

1. In the preparation of a cyano organicsulfonyl chloride by heating a trichlorophosphazosulfonyl organic acyl chloride, the steps comprising heating a mixture containing initially said trichlorophosphazosulfonyl organic acyl chloride and at least one part by weight of the desired cyano organicsulfonyl chloride as a reaction moderator per 100 parts by weight of said trichlorophosphazosulfonyl organic acyl chloride at a temperature of from 150° to 190° C. and removing the POCl₃ as formed.

2. In the preparation of a cyano organicsulfonyl chloride by heating a trichlorophosphazosulfonyl organic acyl chloride, the steps comprising heating a mixture containing initially said trichlorophosphazosulfonyl organic acyl chloride and from about 1 to 10 parts by weight of the desired cyano organicsulfonyl chloride as a reaction moderator per 100 parts by weight of said trichlorophosphazosulfonyl organic acyl chloride at a temperature of from 150° to 190° C. and removing the POCl₃ as formed.

3. The process of claim 2 wherein the POCl₃ is removed at reduced pressure of from 75 to 200 mm. Hg absolute.

4. In the preparation of p-cyanobenzenesulfonyl chloride by heating p-trichlorophosphazosulfonyl benzoyl chloride and splitting out POCl₃, the steps comprising heating a mixture containing initially p-trichlorophosphazosulfonyl benzoyl chloride and from about 2 to about 10 parts by weight of p-cyanobenzenesulfonyl chloride as the reaction moderator per 100 parts by weight of p-trichlorophosphazosulfonyl benzoyl chloride at a temperature of from 150° to 190° C. and a pressure of from 75 to 200 mm. Hg absolute while removing POCl₃ as evolved.

References Cited in the file of this patent

Kirsanov: Chem. Abst., vol. 46, column 1135 (1952).